No. 840,040. PATENTED JAN. 1, 1907.
J. G. CALLAN.
TURBO GENERATOR.
APPLICATION FILED MAY 25, 1905.

7 SHEETS—SHEET 1.

Witnesses:
Helen Oxford
Alex. F. Macdonald

Inventor,
John G. Callan,
By Albert G. Davis
Att'y

No. 840,040. PATENTED JAN. 1, 1907.
J. G. CALLAN.
TURBO GENERATOR.
APPLICATION FILED MAY 25, 1905.
7 SHEETS—SHEET 2.
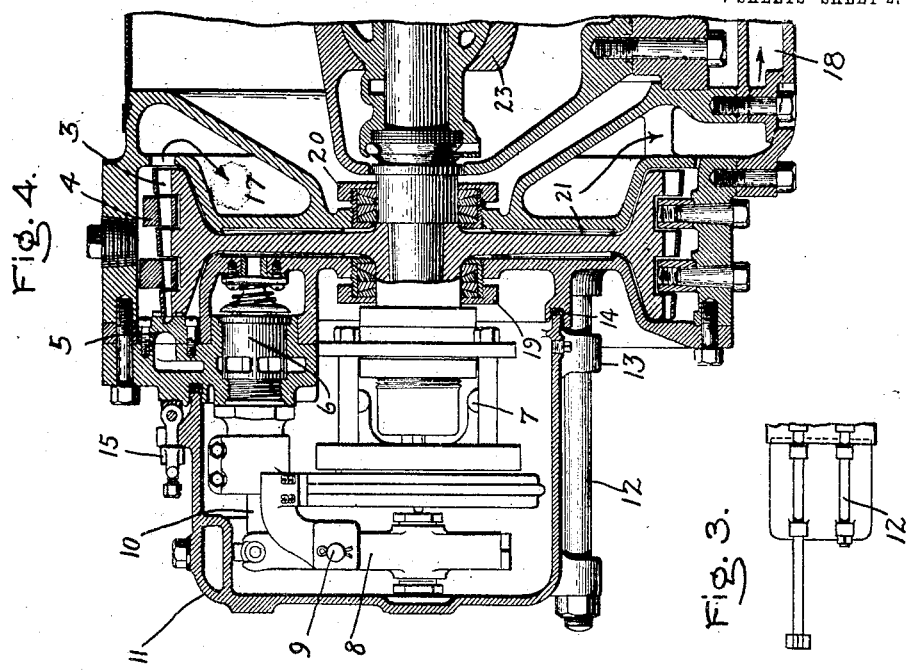
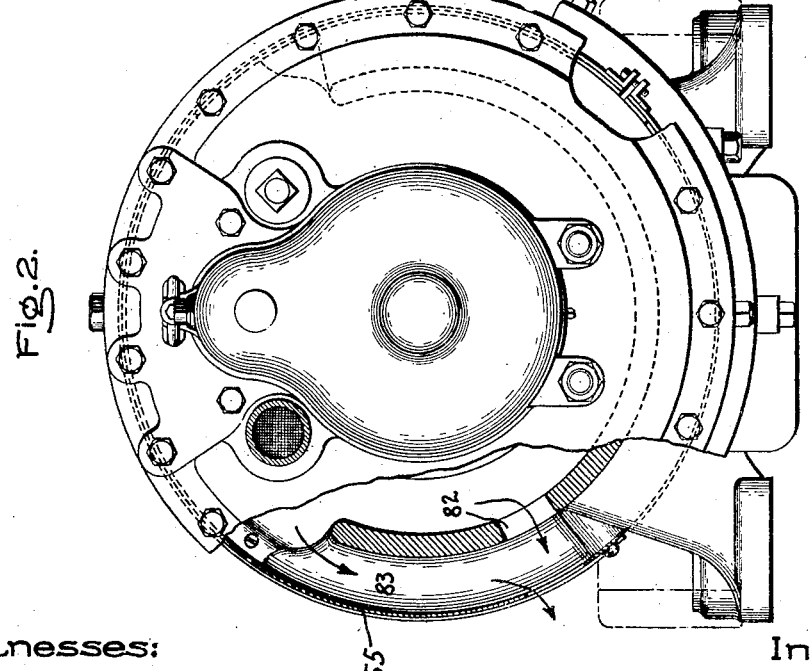
Witnesses:
Helen A. Ford
Alex. F. Macdonald.
Inventor,
John G. Callan,
By Albert G. Davis
Att'y.

No. 840,040. PATENTED JAN. 1, 1907.
J. G. CALLAN.
TURBO GENERATOR.
APPLICATION FILED MAY 25, 1905.
7 SHEETS—SHEET 3.
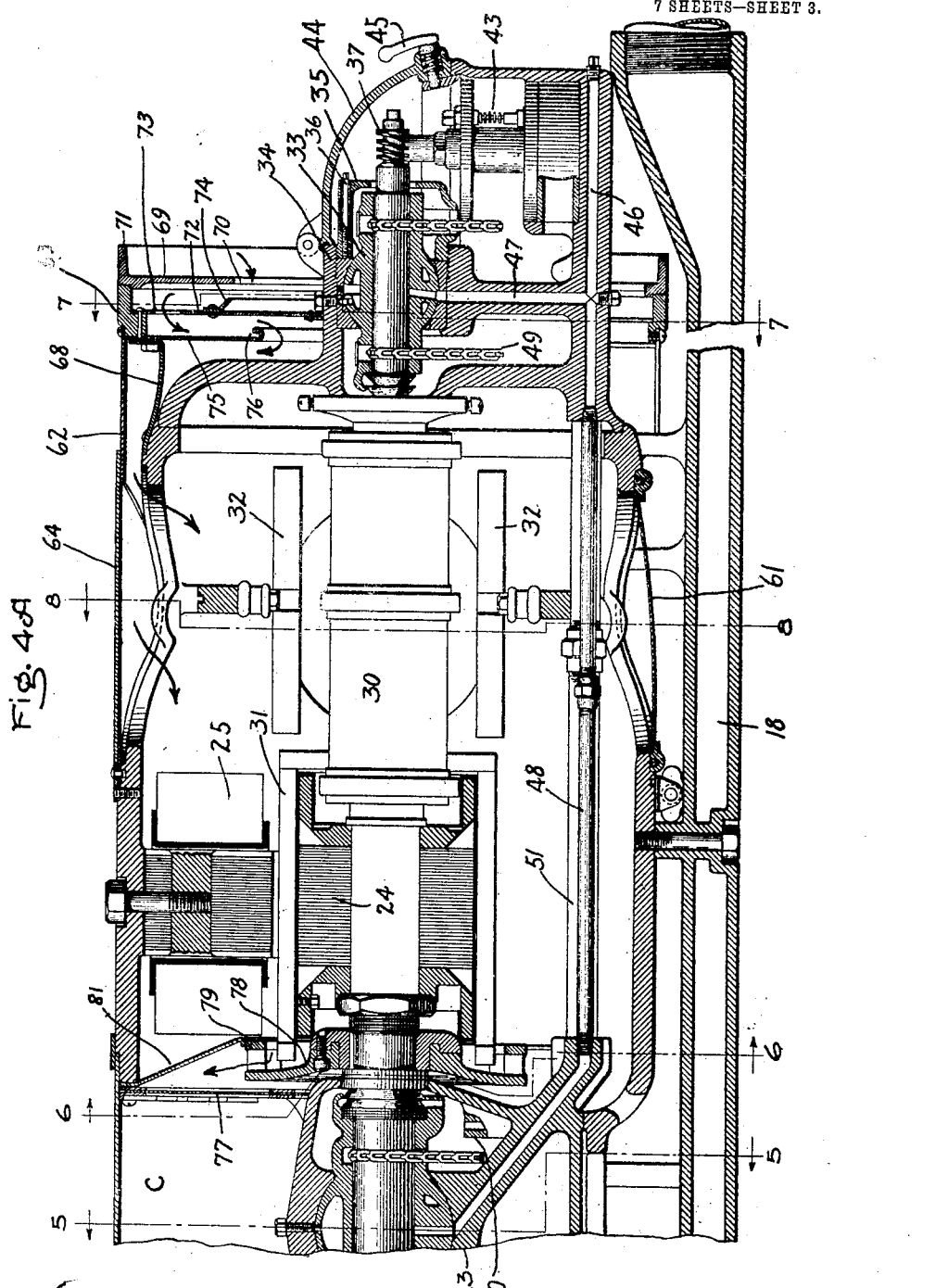
Witnesses:
Helen Orford
Alex F. Macdonald
Inventor,
John G. Callan,
By Albert G. Davis
Att'y.

No. 840,040. PATENTED JAN. 1, 1907.
J. G. CALLAN.
TURBO GENERATOR.
APPLICATION FILED MAY 25, 1905.

7 SHEETS—SHEET 4.

Witnesses:
Helen Oxford
Alex. F. Macdonald

Inventor
John G. Callan
By Albert G. Davis
Att'y

No. 840,040. PATENTED JAN. 1, 1907.
J. G. CALLAN.
TURBO GENERATOR.
APPLICATION FILED MAY 25, 1905.

7 SHEETS—SHEET 5.

Witnesses:
Helen Oxford
Alex F. Macdonald

Inventor,
John G. Callan,
By Albert E. Davis
Atty

No. 840,040. PATENTED JAN. 1, 1907.
J. G. CALLAN.
TURBO GENERATOR.
APPLICATION FILED MAY 25, 1905.

7 SHEETS—SHEET 6.

Witnesses:
Helen Oxford
Alex. F. Macdonald.

Inventor,
John G. Callan,
By Albert K. Davis
Att'y.

No. 840,040. PATENTED JAN. 1, 1907.
J. G. CALLAN.
TURBO GENERATOR.
APPLICATION FILED MAY 25, 1905.

7 SHEETS—SHEET 7.

Witnesses:
Helen Oxford
Alex F. Macdonald

Inventor,
John G. Callan,
By Albert G. Davis
Att'y.

UNITED STATES PATENT OFFICE.

JOHN G. CALLAN, OF LYNN, MASSACHUSETTS, ASSIGNOR TO GENERAL ELECTRIC COMPANY, A CORPORATION OF NEW YORK.

TURBO-GENERATOR.

No. 840,040.　　　Specification of Letters Patent.　　　Patented Jan. 1, 1907.

Application filed May 25, 1905. Serial No. 262,287.

*To all whom it may concern:*

Be it known that I, JOHN G. CALLAN, a citizen of the United States, residing at Lynn, county of Essex, State of Massachusetts, have invented certain new and useful Improvements in Turbo-Generators, of which the following is a specification.

The present invention relates to and has for its object to provide a turbo-generator which is reliable and efficient in operation.

The improvements are directed more particularly to the construction and arrangement of the casing and to the means for providing positive and constant lubrication for the bearings.

Figure 1:
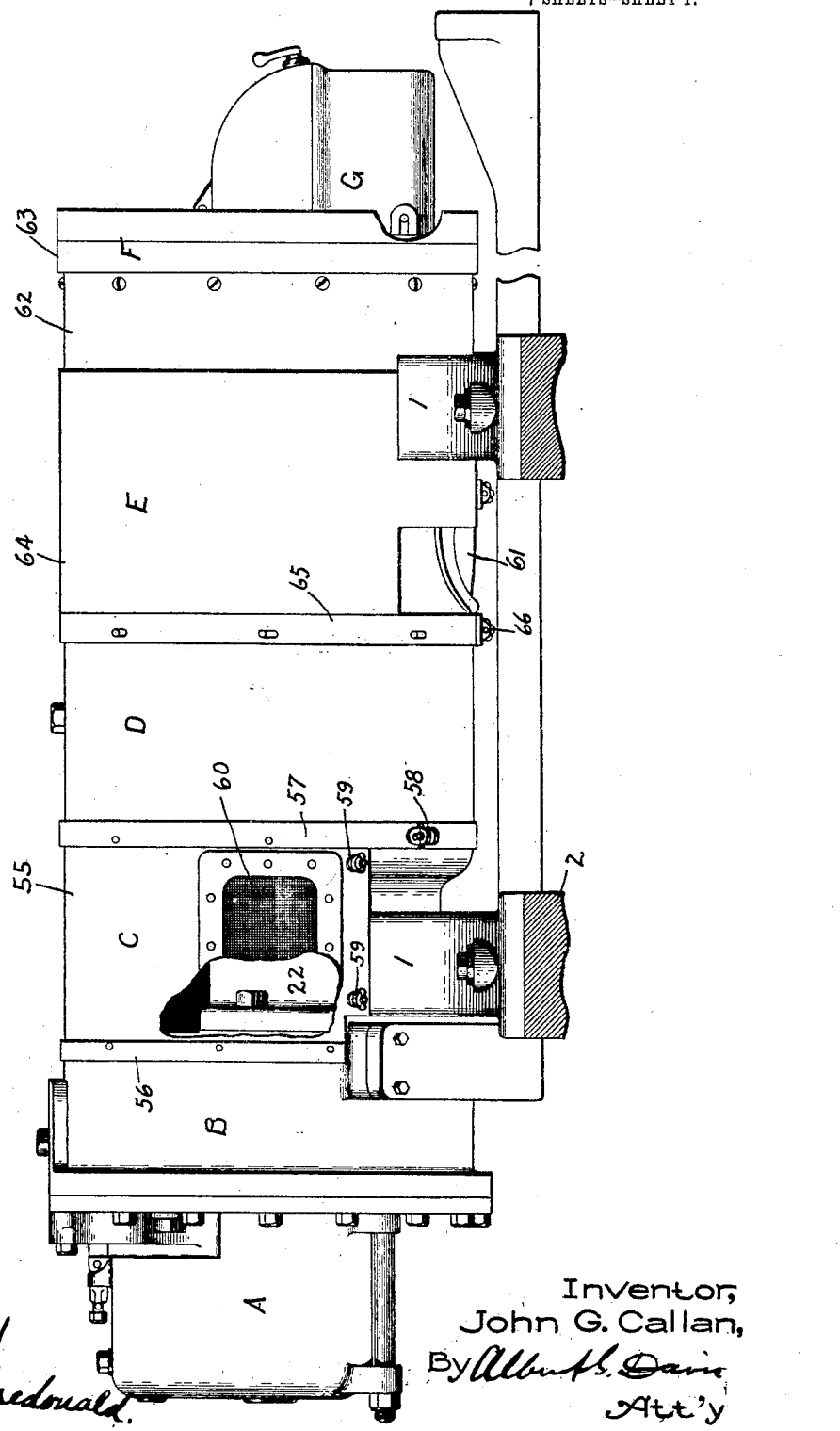
Figure 5:
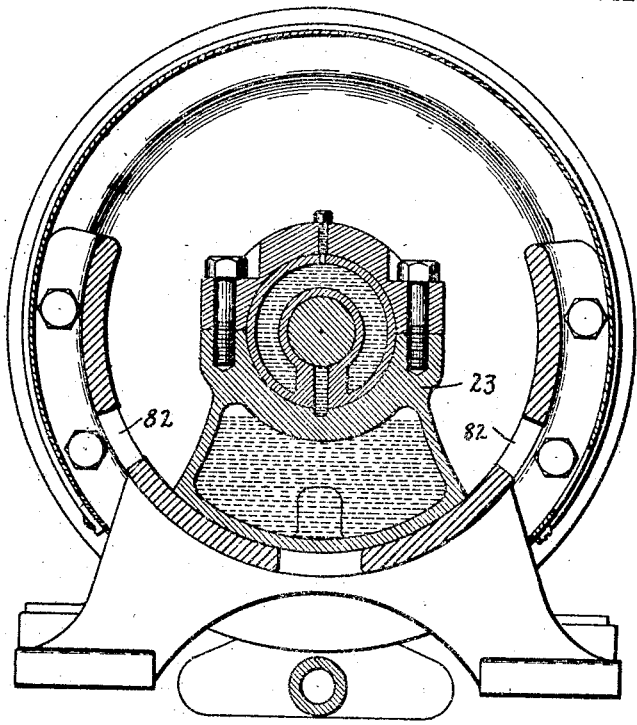
Figure 6:
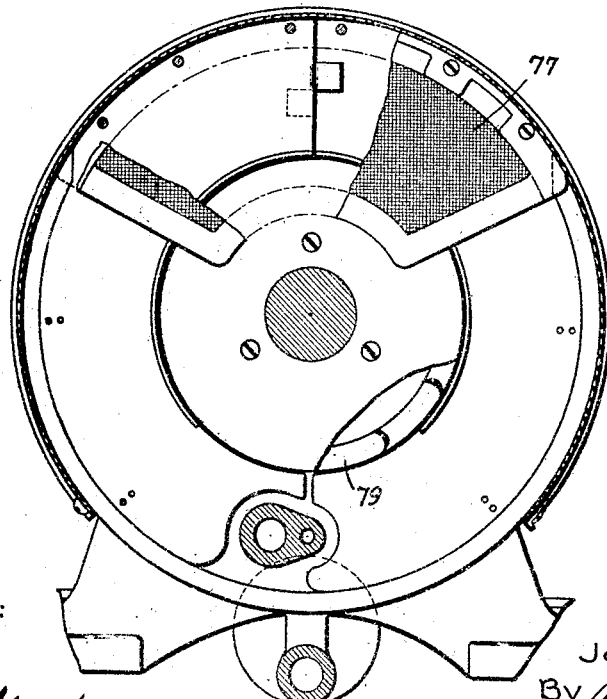
Figure 7:
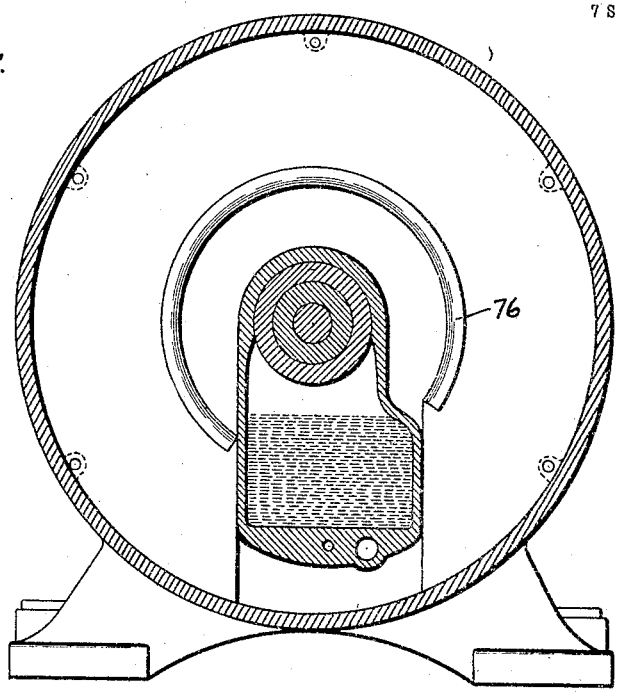
Figure 8:
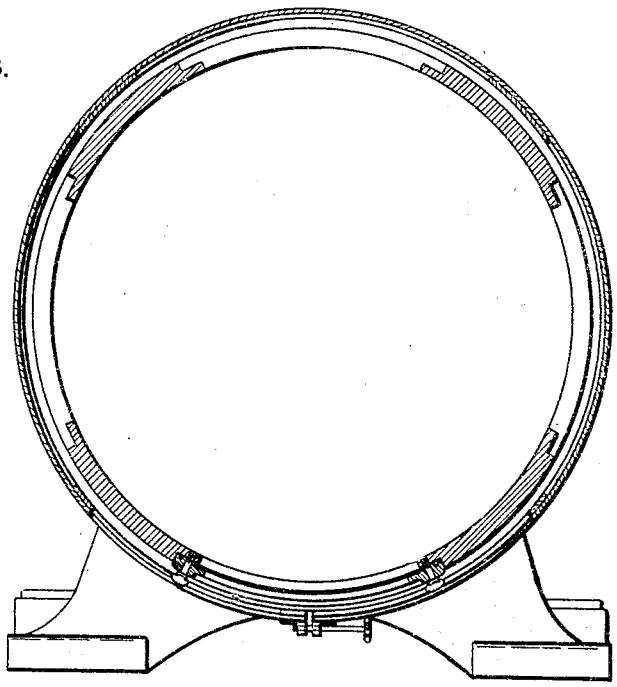
Figure 9:
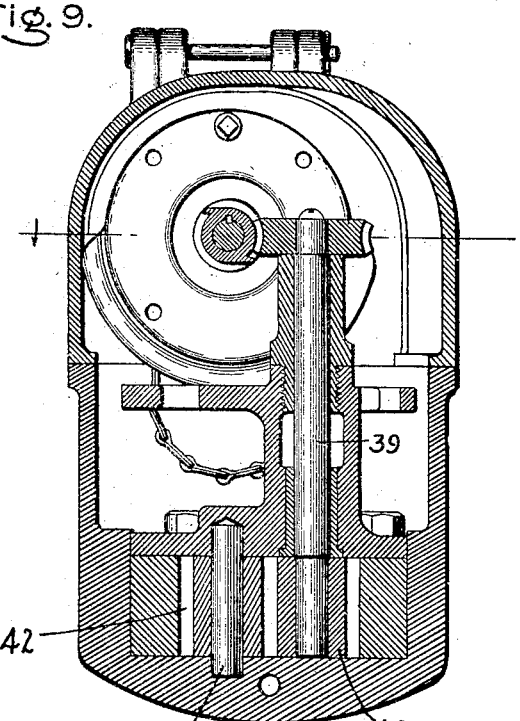
Figure 10:
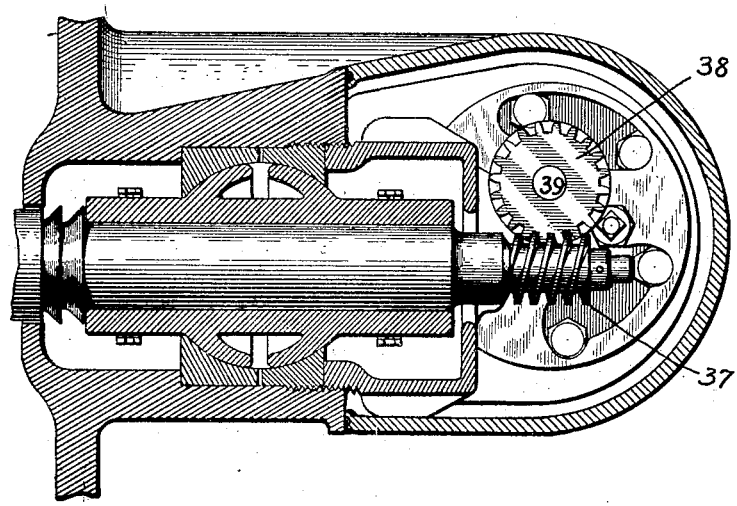
Figure 11:
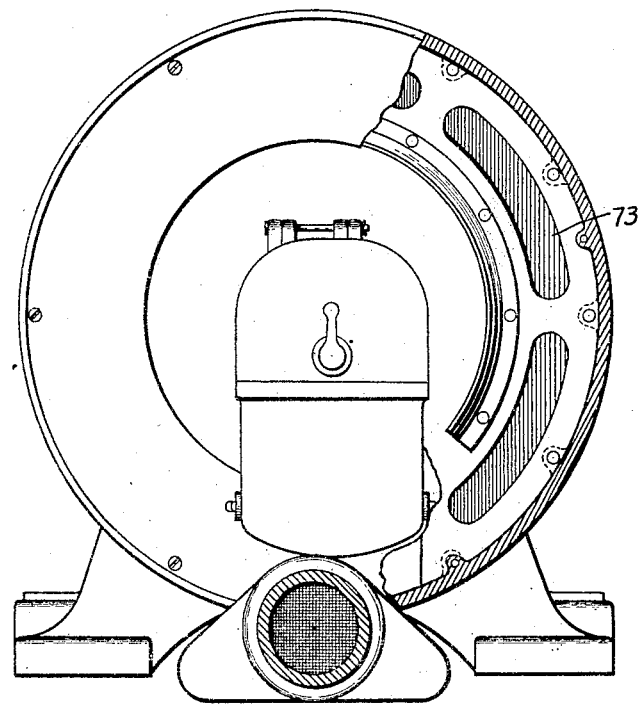
Figure 13:
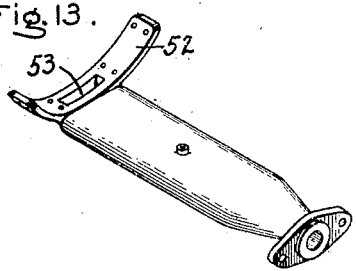
Figure 12:
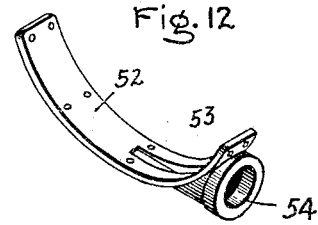
Figure 14:
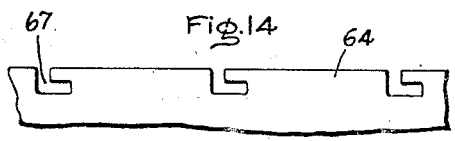
Figure 15:
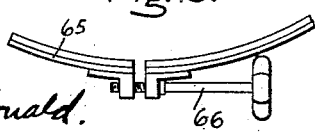

In the accompanying drawings, which illustrate one embodiment of my invention, Figure 1 is a view in side elevation of a turbo-generator. Fig. 2 is a view in end elevation looking toward the turbine, with certain of the parts broken away. Fig. 3 is a detail view on a small scale, showing the means for supporting the shaft-governor casing. Fig. 4 is an axial section of the turbine. Fig. 4^A is an axial section through the generator. Fig. 5 is a cross-section taken on line 5 5 of Fig. 4^A, looking in the direction of the arrows. Fig. 6 is a cross-section taken on line 6 6 of Fig. 4^A and looking in the direction of the arrows. Fig. 7 is a sectional view through the air-baffling means at the generator end of the machine, the said section being taken on line 7 7 of Fig. 4^A. Fig. 8 is a transverse section of the frame of the generator, taken on line 8 8 of Fig. 4^A, looking in the direction of the arrows. Fig. 9 is a sectional view through the gear-pump for supplying lubricant to the bearings. Fig. 10 is a partial axial section showing the driving connection between the main shaft and the lubricating-pump. Fig. 11 is a view in end elevation looking at the generator end of the machine, with certain of the parts broken away for the purpose of illustration. Figs. 12 and 13 are perspective views of modified forms of exhaust-conduits, and Figs. 14 and 15 are detail views showing the means for securing the covering to the machine-casing.

The present invention relates to turbo-generators, and more especially to those intended for out-of-door service. The present machine is designed to be used in connection with steam locomotives and is intended to be located on top of the boiler where it is exposed to the effects of rain, sleet, snow, dirt, &c. It is to be understood, however, that the invention is not limited to this class of work alone, since it is capable of wide application. Owing to the severe requirements of such service, it is necessary to inclose the working parts in such manner that they are fully protected from the elements, while at the same time they must be readily accessible for the purpose of inspection or repair.

The turbo-generator is divided into sections. A represents the governor-section, B the turbine-section, C the bearing-section, D the generator-section, E the commutator-section, F the head-section, and G the gear-pump section. The machine is supported by feet 1, which are bolted to the supports 2, forming a part of the locomotive or other suitable support.

The turbine is overhung—that is to say, it is located beyond the shaft-bearing. For the purpose of illustration it is shown as being of the Curtis single-stage type; but the invention is not limited to the specific construction shown. The turbine is provided with three rows of wheel-buckets 3, Fig. 4, and between adjacent rows of wheel-buckets are stationary or intermediate buckets 4. Steam or other elastic fluid is supplied to the turbine by one or more conduits communicating with a sectionalized expanding-nozzle 5, the latter being bolted to the wheel-casing. The admission of steam is controlled by the balanced throttle-valve 6, the latter being moved to and fro by a speed-responsive device comprising the weight-arms 7 and a suitable opposing spring. Motion from the speed-responsive device is communicated by the lever 8, having a pivot 9, to the valve-stem 10, the latter being suitably connected to the valve.

In the construction of a machine of this class it is of great importance to inclose the governor and the attached parts in a casing and to so arrange the casing that it can be removed from or applied to the machine without danger due to striking the rapidly-rotating parts or in any way interfering with the governing mechanism. In most instances the governor-casing will be removed only when the wheel is stationary, but it is of particular importance to construct the parts in such manner that accidents cannot happen when the machine is running even though the attendant is careless. In order to satisfy these conditions, the governor and its attached parts are inclosed in a casing 11, which is carried by two or more longitudinally-extending rods or supports 12. These rods pass through lugs 13, formed on the side of the casing. The lugs in addition to assisting to secure the casing in place act as guides to hold it in proper alinement while being removed or reassembled in place. By preference, one of the rods is made longer than the other, so that it can act as a pivotal support for the casing after the latter is moved to a position where it exposes the governor. After the casing has been moved back against the stop on the long rod it may be permitted to swing around said rod as a pivot and expose the end of the governor and valve-lever. This gives complete access to the parts without entirely removing the casing. When it is desired to reassemble the parts, the casing is swung back until the second rod registers with the holes in the lugs, after which the casing as a whole is moved toward the turbine. The casing fits into a groove 14, containing asbestos or other suitable packing, and is clamped in place by a suitable stud or swinging bolt 15 and one or more nuts on the rods or supports.

The steam or other elastic fluid exhausting from the bucket-wheel enters the exhaust-carrying conduit 17, which surrounds the main shaft and communicates at a point below the shaft with an exhaust-carrying conduit 18, which may extend longitudinally of the machine or transverse thereat, as will appear hereinafter. The casing for the bucket-wheel is provided with packings 19 and 20, the former serving to prevent the entrance of steam into the governor-casing 11 and the latter to prevent it from escaping into the bearing-section C. In addition to the packings radially-extending fan-blades 21 are mounted on opposite sides of the wheel-web, which create a pressure that tends to more or less balance the pressure of steam within the wheel-casing, and thus reduce leakage.

The generator is provided with a longitudinal neck 22, which extends about two-thirds around the shaft and is bolted to and supports the casing of the turbine. The bolt-holes in the neck and turbine-casing are placed equidistant, so that the turbine can be axially adjusted with respect to the generator, if desired. Mounted within the neck or projection is a shaft-bearing 23. (Best shown in Figs. 4ᴬ and 5.) The bearing is also made adjustable, so that the oil-reservoir contained in the base thereof will always stand in a horizontal position.

The generator in the present embodiment of the invention is of the bipolar direct-current type. Referring to Fig. 4ᴬ, 24 represents the armature or revolving portion, and 25 the stationary or field portion. In practice the field-poles occupy a horizontal plane, but for the purpose of illustrating the general position of the field-poles with respect to the armature-conductors one of them has been shown in a vertical plane and ninety degrees displaced from its normal position. The number of field-poles in the machine can be changed to satisfy the conditions of operation. The generator may be of the alternating or direct current type, as best suits the conditions of service.

30 represents the commutator to which the armature-bars 31 are secured.

32 represents the supports for the brush-holders, the latter being omitted to simplify the illustration. The right-hand end of the main shaft is provided with a spherical bearing-sleeve 33, that is mounted on a suitable bracket carried by the head 34 of the generator. The bearing-sleeve is held in place in a suitable collar having a spherical bearing-surface, said collar being made in two parts, one of which has a smooth periphery and is seated against a shoulder in the head, while the other is threaded and is screwed into the head 34 of the generator-frame. The right-hand part of the collar is prevented from turning by the nut 35, the latter being clamped by the bolt 36. The extreme end of the shaft is provided with a worm 37, that meshes with the worm-wheel 38, Figs. 4ᴬ, 9, and 10. The worm-wheel is mounted upon the upper end of the spindle 39, the latter being provided with suitable bearings, and at the lower end with a gear 40, forming a part of a gear-pump for supplying lubricant to the bearings. Meshing with the gear 40 and mounted on a separate spindle 41 is a gear 42, also forming a part of the gear-pump. The pump is mounted within a casing formed integral with the head of the generator-frame. The gears are normally submerged in lubricant, and a suitable valve 43 is provided, which by-passes the fluid from the high-pressure to the low-pressure side of the pump when the pressure exceeds a certain predetermined amount. The casing, which incloses the pump and actuating parts, is provided with a hinged cover 44, having a latch or other retaining device 45. Fluid under pressure from the pump is discharged into the horizontal passage 46, which communicates with the vertical passage 47, leading to the right-hand bearing, and with the pipe 48, communicating with the left-hand bearing. In the casing surrounding each of the bearing-sleeves is a reservoir into which the chains 49 enter and convey lubricant to the shaft. These chains form an auxiliary lubricating device, which insures the proper lubrication of the bearings in the event of the pump failing to give the necessary amount. The reservoirs are so constructed and arranged as to maintain a constant or approximately constant level of the lubricant. A suitable arrangement for accomplishing this purpose is shown in connection with the left-hand bearing Fig. 4ᴬ, wherein 50 represents a projection containing an orifice that extends through the boss into the return-pipe 51, so that the top of the boss represents the level of the lubricant in the reservoir. The supply and return pipes are located within the generator-frame to protect them from injury and to keep the oil from coagulating in cold weather.

The position of the exhaust-carrying conduit from the turbine is well shown in Fig. 4ᵃ. In this figure the conduit is shown as running from the turbine, which is located at the left, toward the right of the machine, or toward the smoke-stack when the turbo-generator is mounted upon a locomotive. This conduit is preferably made separable from the turbine and generator, but under certain conditions it may be formed in the base of the machine.

It is sometimes desirable to take the exhaust from the side of the turbine instead of passing it underneath the generator, as shown. This may be done by employing the construction shown in Fig. 12 and in broken and dotted lines, Fig. 2, wherein 52 represents a saddle having an orifice 53, communicating with the conduit 54, that is piped to the exhaust. The saddle is provided with suitable bolt-receiving holes spaced equally on both sides of the center, so that the conduit 54 can be located on the right-hand side or on the left-hand side of the machine.

In Fig. 13 is shown a perspective of the saddle-piece 52, connected to a longitudinally-extending exhaust-conduit 18. The bolt-holes on the saddle-piece are so arranged that the conduit may be extended forward under the generator or rearward under the turbine.

In order to prevent rain, snow, sleet, or dirt entering the bearing-section C, a sheet-metal cover 55 is provided which extends about two-thirds of the way around the shaft, suitable ventilating-openings being provided in the lower part and between cover 55 and the neck 22, which is of a smaller diameter. Retaining-bands 56 and 57 are employed to maintain the form of the cover and also to secure it in place. The band 57 is provided with an attaching-nut and bolt 58 for clamping it around the frame of the generator. In addition to this, removable clamping-screws 59 are provided. As a further means for ventilating the interior of the machine, the casing may be provided with a screen 60; but care should be exercised to see that the top edge of the screen is somewhat below the upper surface of the neck 22, as otherwise water might work into it. The field-magnet frame of the generator being circular and unbroken it is unnecessary to provide it with a detachable cover. The commutator-section E is, however, provided with one or more openings through which the brushes and brush-holders are accessible and which assist in cooling the generator by permitting a circulation of air. In the present illustration four of these openings around the commutator are provided, and the lower one is closed by a suitable cover 61, that is held in place by bolts. The cover may comprise a sheet of metal or a fine-mesh screen, depending upon the conditions of service. When mounted on a locomotive, this cover can with advantage be made of sheet metal. Surrounding the right-hand end of the generator-frame and also the head is a cylindrical cover 62, which assists in protecting the parts from dirt and moisture and also attaches to the head 63, the latter being arranged to baffle the incoming currents of air, as will appear hereinafter. Surrounding the commutator-section of the generator is a light sheet-metal cover 64, resting upon the cylindrical cover 62. The cover 64 is secured in place by means of a band 65, Fig. 1, that is provided with a clamping-screw 66, Fig. 15. In Fig. 14 is shown a portion of the cover 64 on a somewhat enlarged scale, with slots 67 therein forming a part of a lantern or bayonet joint.

In a construction of this kind if everything were inclosed it is evident that the temperature of the generator might at times increase to a point where it would result in injuring the insulation of the field and armature conductors, and thus decrease the life of the machine. It is also obvious that the entrance of any substantial amount of water or dirt into the generator would be accompanied by disastrous results. To obtain the benefits incident to good ventilation without the dangers incident to the admission of foreign matter, I provide a head 63 for the machine which is supported by suitable brackets 68, attached to the frame of the generator and the cylindrical casing 62. The head, as illustrated, comprises a ring which surrounds the shaft-bearing and its support and is provided on the right-hand side, or forward part of the machine when on a locomotive, with a baffle-plate 69. This plate is provided with an enlarged central opening 70 and a circular flange 71, the latter assisting to direct currents of air inward toward the opening 70. Situated directly back of the baffle-plate 69 is a disk 72, which makes a snug fit around the bearing and is provided with a number of segmental arc-shaped openings 73, Fig. 11. Mounted on the right face of the disk 72 is a ring having a lip 74, that acts to catch water or dirt entering through the opening 70 and causes it to run down to the bottom of the machine without entering the commutator-space. If, however, any foreign matter is carried beyond by the incoming currents of air, the tendency is for it to strike the inner cylindrical wall of the head and drop back instead of passing through the segmental opening 73. If, however, any foreign matter is carried by the air through these segmental openings, the baffle-plate 75, situated in front of the openings, tends to arrest it. The plate 75 is provided with a cylindrical opening around the shaft, which opening is provided with a gutter 76, that conveys any foreign matter downward and out of the path of the incoming air.

From the foregoing it will be seen that the plates 69 and 75, disk 72, and lip 74 act as a baffling means to prevent the entrance of foreign matter into the generator, without, however, seriously interfering with the entrance of air. I have found the construction shown to be satisfactory in practice; but I do not wish to be understood as limiting my invention in all respects to the specific construction shown, since it can be modified without departing from the spirit of my invention.

After the air enters the chamber between the cover 62 and the frame of the generator it passes through the openings in said frame around the commutator and over the conductors in the rotating and stationary members of the generator, and thence out through a screen 77, Figs. 4^A and 6, located between the field-magnet frame and the shaft-bearing at the turbine end. When the locomotive is in motion, a sufficient amount of air would pass through the generator and over the bearings near the turbine to keep the parts cool; but in the event of a locomotive remaining stationary for any length of time, with the turbo-generator running under normal load conditions, it is desirable to provide a means for definitely creating a flow of air over the conductors. Such a means is provided in this case and comprises a fan 78, the moving member of which is mounted on the main shaft, and is provided with revolving blades 79. Situated adjacent to the blades is a ring that is supported by a disk 81, the latter being so arranged that it prevents the air from passing out of the casing without it first flows through the fan or blower 78. The air flowing through the generator is discharged into the bearing-section C, and in passing over the bearing contained therein and over the wall of the generator, tends to reduce their temperatures. It also definitely prevents any flow of heated air from the turbine toward the generator, as will be later noted. The air is permitted to escape through openings 82, Figs. 2 and 5, formed in the neck, through passage 83, located between the neck and the surrounding cover 55, and through the space between neck and cover. It will thus be seen that the outlet for the air is comparatively unrestricted, so that a large amount of air can pass through the machine, and thus maintain its temperature below the prescribed limit.

It will be seen that the air is drawn by the fan from the far end of the generator and is discharged at a point or points between the generator and the turbine. I regard this as an important feature of the invention, since it insures a continuous supply of cool air and also prevents or largely reduces the tendency for heated air or steam due to leakage to pass from the turbine into the generator-casing. The fan is shown in connection with a horizontal machine; but the invention is not to be construed as so limited, since it is also applicable to machines where the shaft occupies a vertical position. The invention is particularly useful with large machines of the vertical-shaft type which are located in central stations, because it prevents the heated air rising from the turbine form passing through the generator. In other words, the fan creates a current of air which opposes those air-currents rising from the turbine and also blows relatively cool air over the parts of the turbine adjacent thereto.

The structure and arrangement of the casing, the baffling device, and the fan for ventilating and cooling the mechanism are not specifically claimed herein, because they form the subject-matter of my divisional application, Serial No. 320,756, filed June 8, 1906, which division was made at the requirement of the United States Patent Office.

In accordance with the provisions of the patent statutes I have described the principle of operation of my invention, together with the apparatus which I now consider to represent the best embodiment thereof; but I desire to have it understood that the apparatus shown is only illustrative and that the invention can be carried out by other means.

What I claim as new, and desire to secure by Letters Patent of the United States, is—

1. An elastic-fluid motor comprising relatively movable elements and a governor therefor, in combination with a casing which incloses the governor, and a support for the casing along which it is movable to give access to the governor.

2. An elastic-fluid motor comprising relatively movable elements and a governor therefor, in combination with a casing which incloses the governor, a support for the casing along which it is movable to give access to the governor, and a means for securing the casing in a position to inclose the governor.

3. An elastic-fluid motor comprising relatively movable elements and a governor therefor, in combination with a casing which incloses the governor, a support for the casing along which it is movable to give access to the governor, a means for securing the casing in a position to inclose the governor, and a packing located between the casing for the governor and that for the relatively movable elements.

4. An elastic-fluid motor comprising a wheel, a casing therefor, and means for discharging fluid to the wheel, in combination with a governor for regulating the speed of the wheel, a casing for the governor, and supports on which the governor-casing is freely movable to expose the governor, one of said supports acting as a pivot for the casing.

5. In combination, a generator, a motor united therewith for driving it, a governor driven by the shaft of the motor and located on the side of the motor remote from the generator, and a pump for supplying lubricant to the bearings, which is also driven by the motor-shaft and is located on the side of the generator remote from the motor.

6. A turbine in combination with a saddle-piece which is detachably secured to the turbine and contains an exhaust-conduit.

7. A turbine, in combination with a detachable saddle-piece, an exhaust-conduit attached thereto, and means for securing the saddle-piece to the turbine in such manner that the conduit can extend in one direction or the other with respect to the turbine.

8. In combination, a turbine, a generator driven thereby, and an exhaust-conduit which is attached to the turbine and extends longitudinally under the generator.

9. In combination, a bucket-wheel, a casing therefor, an exhaust-chamber formed in the casing which surrounds the wheel-shaft, and a conduit detachably secured to the wheel-casing which communicates with the exhaust-chamber and extends longitudinally of the machine.

10. In combination, a bucket-wheel, a casing therefor, a shaft for supporting the wheel carried by a suitable bearing, a pump geared to the shaft, a conduit leading from the high-pressure side of the pump to the bearing, a casing inclosing the pump and in which the latter is submerged, and a return-pipe which receives lubricant after it has passed through the bearing and returns it to the pump-inclosing casing.

11. In combination, a driving and a driven element, bearings for the driving-shaft, a pump driven by the shaft, conduits leading from the pump to the bearings, a casing which incloses the pump and in which it is submerged, the said casing also acting as a reservoir for the lubricant flowing out of one of the bearings, and a conduit which returns fluid from another bearing and discharges it into the casing.

12. In combination, a driving and a driven element, bearings for the driving-shaft, a pump for supplying lubricant under pressure to the bearings, a casing which incloses each of the bearings and forms a reservoir, and a device moving with the shaft and dipping into the lubricant in the casing which serves as an auxiliary lubricator.

In witness whereof I have hereunto set my hand this 22d day of May, 1905.

JOHN G. CALLAN.

Witnesses:
JOHN A. McMANUS, Jr.,
ROBERT SHAND.